US012681357B2

(12) United States Patent
Liao et al.

(10) Patent No.: US 12,681,357 B2
(45) Date of Patent: Jul. 14, 2026

(54) ACTIVE DEVICE SUBSTRATE

(71) Applicant: AUO Corporation, Hsinchu (TW)

(72) Inventors: Chi-Sheng Liao, Hsinchu (TW); Ken Wei Chang, Hsinchu (TW); Bo-Ru Jian, Hsinchu (TW); Bin Cheng Lin, Hsinchu (TW); Ta-Wen Liao, Hsinchu (TW)

(73) Assignee: AUO Corporation, Hsinchu (TW)

( * ) Notice: Subject to any disclaimer, the term of this patent is extended or adjusted under 35 U.S.C. 154(b) by 280 days.

(21) Appl. No.: 18/398,008

(22) Filed: Dec. 27, 2023

(65) Prior Publication Data

US 2025/0189858 A1 Jun. 12, 2025

(30) Foreign Application Priority Data

Dec. 12, 2023 (TW) ................................. 112148352

(51) Int. Cl.
*G02F 1/16766* (2019.01)
*G02F 1/167* (2019.01)

(52) U.S. Cl.
CPC .......... *G02F 1/16766* (2019.01); *G02F 1/167* (2013.01)

(58) Field of Classification Search
CPC ... G02F 1/16766; G02F 1/167; G02F 1/13629
See application file for complete search history.

(56) References Cited

U.S. PATENT DOCUMENTS 11,189,797 B2 11/2021 Zhang
2022/0013615 A1* 1/2022 Baek .................... H10D 86/441

FOREIGN PATENT DOCUMENTS

| CN | 104218039 | 10/2017 |
| CN | 109461743 | 3/2019 |
| CN | 106328693 | 7/2019 |
| CN | 114023802 | 2/2022 |

* cited by examiner

*Primary Examiner* — James A Dudek
(74) *Attorney, Agent, or Firm* — JCIPRNET

(57) ABSTRACT

An active device substrate includes an active device and an electrode. The electrode includes a first light shielding conductive pattern, a second light shielding conductive pattern, a third light shielding conductive pattern, and a first metal oxide protection pattern. The first light shielding conductive pattern, the second light shielding conductive pattern, and the third light shielding conductive pattern are sequentially stacked to form a conductive stack. The conductive stack is disposed in an opening of the first metal oxide protection pattern. A first portion, a second portion, and a third portion of the first metal oxide protection pattern respectively contact a sidewall of the first light shielding conductive pattern, a sidewall of the second light shielding conductive pattern, and a sidewall of the third light shielding conductive pattern. Materials of the first portion, the second portion, and the third portion of the first metal oxide protection pattern are the same.

6 Claims, 9 Drawing Sheets

10

$$120 \begin{cases} 122 \\ 124 \end{cases}$$

122(T)                                    124(Cst)

$$T \begin{cases} 122 \\ 140 \end{cases} \qquad 120 \begin{cases} 122 \\ 124 \end{cases}$$

140

122                                    124(Cst)

$T\begin{cases}122\\140\end{cases}$          $120\begin{cases}122\\124\end{cases}$ $Cst\begin{cases}124\\156\end{cases}$          $120\begin{cases}122\\124\end{cases}$          $150\begin{cases}152\\154\\156\end{cases}$ $$Cst \begin{cases} 124 \\ 156 \end{cases} \qquad 120 \begin{cases} 122 \\ 124 \end{cases} \qquad 150 \begin{cases} 152 \\ 154 \\ 156 \end{cases}$$

$$Cst \begin{cases} 124 \\ 156 \end{cases} \qquad 120 \begin{cases} 122 \\ 124 \end{cases} \qquad 150 \begin{cases} 152 \\ 154 \\ 156 \end{cases}$$

182c"

182b"

182a"

PR

182c"

182b"

182a"

$$182 \begin{cases} 182a \\ 182b \\ 182c \\ 182d \\ 182e \end{cases} \quad 182d \begin{cases} 182d\text{-}1 \\ 182d\text{-}2 \\ 182d\text{-}3 \end{cases} \quad 170 \begin{cases} 170\text{-}1 \\ 170\text{-}2 \\ 170\text{-}3 \end{cases}$$

ACTIVE DEVICE SUBSTRATE

CROSS-REFERENCE TO RELATED APPLICATION

This application claims the priority benefit of Taiwan application serial no. 112148352, filed on Dec. 12, 2023. The entirety of the above-mentioned patent application is hereby incorporated by reference herein and made a part of this specification.

BACKGROUND

Technical Field

The disclosure relates to an active device substrate.

Description of Related Art

In the realm of an electronic paper display technology, the primary emphasis resides in replicating the visual characteristics of printing and writing on paper while minimizing power consumption. Unlike conventional displays that achieve display functions through self-luminescence, the electronic paper, similar to the conventional paper, relies on ambient illumination, thereby enhancing the readability experience. The electronic paper that facilitates seamless display screen transitions involves the integration of an electronic ink layer and an active device substrate configured to drive the electronic ink layer. The active device substrate has a plurality of electrodes for controlling a plurality of pixels. However, the occurrence of uneven protruding microstructures on sidewalls of metal patterns of the electrodes poses a significant challenge. During the formation of a metal oxide layer on the metal patterns to prevent oxidation, the protruding microstructures on the sidewalls have a propensity to penetrate the metal oxide layer. Such penetration compromises the effectiveness of the metal oxide layer in safeguarding the metal patterns of the electrodes, thereby adversely impacting the overall reliability of the electronic paper.

SUMMARY

The disclosure provides an active device substrate with favorable reliability.

An embodiment of the disclosure provides an active device substrate that includes a substrate, an active device, and an electrode. The active device is disposed on the substrate. The electrode is electrically connected to the active device and includes a first light shielding conductive pattern, a second light shielding conductive pattern, a third light shielding conductive pattern, and a first metal oxide protection pattern. The first light shielding conductive pattern, the second light shielding conductive pattern, and the third light shielding conductive pattern are sequentially stacked to form a conductive stack. The first metal oxide protection pattern has an opening. The conductive stack is disposed in the opening. The first metal oxide protection pattern includes a first portion, a second portion, and a third portion. The first portion, the second portion, and the third portion of the first metal oxide protection pattern respectively contact a sidewall of the first light shielding conductive pattern, a sidewall of the second light shielding conductive pattern, and a sidewall of the third light shielding conductive pattern. A material of the first portion, a material of the second portion, and a material of the third portion of the first metal oxide protection pattern are identical.

Several exemplary embodiments accompanied with figures are described in detail below to further describe the disclosure in details.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1A:
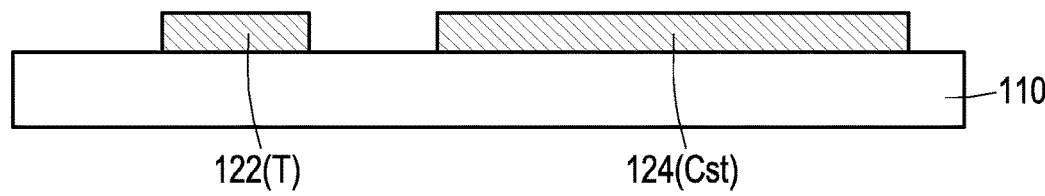
FIG. 1A to FIG. 1G are schematic cross-sectional views of a manufacturing process of an active device substrate according to an embodiment of the disclosure.

Reference will now be made in detail to the exemplary embodiments of the disclosure, examples of which are illustrated in the accompanying drawings. Whenever possible, the same reference numbers are used in the drawings and the description to refer to the same or like parts.

It should be understood that when a device, such as a layer, a film, a region, or a substrate is referred to as being "on" or "connected to" another element, it can be directly on or connected to the another device, or an intermediate device may also be present. By contrast, when a device is referred to as being "directly on" or "directly connected to" another device, no intermediate device is present. As used herein, being "connected" may refer to a physical and/or electrical connection. Furthermore, being "electrically connected" or "coupled" may refer to the presence of other devices between the two devices.

Considering the particular amount of measurement and measurement-related errors discussed (i.e., the limitations of the measurement system), the terminology "about," "approximately," or "substantially" used herein includes the average of the stated value and an acceptable range of deviations from the particular value as determined by those skilled in the art. For instance, the terminology "about" may refer to as being within one or more standard deviations of the stated value, or within ±30%, ±20%, ±10%, or ±5%. Furthermore, the terminology "about," "approximately," or "substantially" as used herein may be chosen from a range of acceptable deviations or standard deviations depending on the optical properties, etching properties, or other properties, rather than one standard deviation for all properties.

Unless otherwise defined, all terminologies (including technical and scientific terminologies) used herein have the same meaning as commonly understood by people having ordinary skill in the art to which the disclosure belongs. It is understood that these terminologies, such as those defined in commonly used dictionaries, should be interpreted as having meanings consistent with the relevant art and the background or context of the disclosure, and should not be interpreted in an idealized or overly formal way, unless otherwise defined in the disclosure.

FIG. 1A to FIG. 1G are schematic cross-sectional views of a manufacturing process of an active device substrate according to an embodiment of the disclosure.

With reference to FIG. 1A, a substrate 110 is provided. In an embodiment, a material of the substrate 110 may be glass, quartz, an organic polymer, or any other applicable material. A first conductive layer 120 is then formed on the substrate 110. In an embodiment, the first conductive layer 120 may include a control terminal 122 of an active device T and a first electrode 124 of a storage capacitor Cst, where the control terminal 122 and the first electrode 124 are structurally separated from each other. The control terminal 122 of the active device T is electrically connected to a gate line (not shown). In consideration of electrical conductivity, the first conductive layer 120 is normally made of a metal material, which should however not be construed as a limitation in the disclosure. According to other embodiments, the first conductive layer 120 may also be made of other conductive materials, such as alloys, nitrides of metal materials, oxides of metal materials, oxynitrides of metal materials, or stacked layers of metal materials and other conductive materials.

Figure 1B:
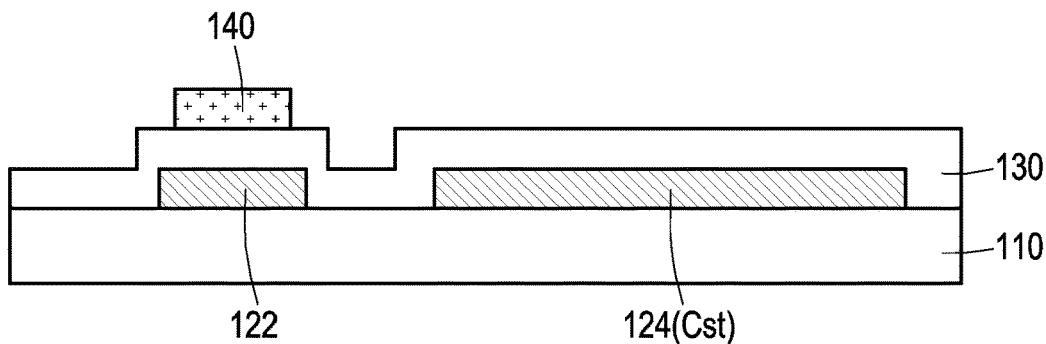

With reference to FIG. 1B, a gate insulation layer 130 is formed on the substrate 110 to cover the first conductive layer 120. In this embodiment, a material of the gate insulation layer 130 may include an inorganic material (e.g., silicon oxide, silicon nitride, silicon oxynitride, or a stacked layer containing at least two of the above materials), an organic material, or a combination of the above-mentioned materials. A semiconductor pattern 140 of the active device T is then formed on the gate insulation layer 130. The semiconductor pattern 140 may have a single-layer structure or a multi-layer structure. For instance, in one embodiment, the semiconductor pattern 140 may include amorphous silicon, polysilicon, microcrystalline silicon, monocrystalline silicon, an organic semiconductor material, an oxide semiconductor material (e.g., indium zinc oxide, indium gallium zinc oxide, other suitable materials, or a combination of the above), other suitable materials, the above-mentioned materials containing dopants, or a combination of the above.

Figure 1C:
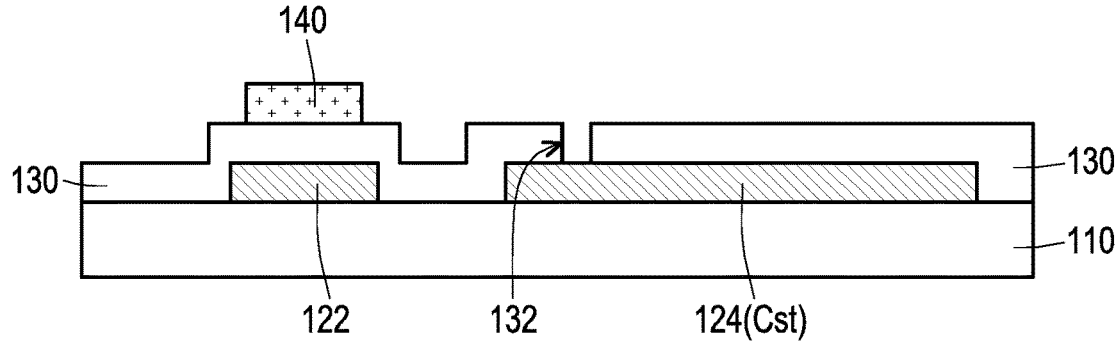

With reference to FIG. 1C, a contact window 132 is formed in the gate insulation layer 130, where the contact window 132 exposes a portion of the first electrode 124 of the storage capacitor Cst.

Figure 1D:
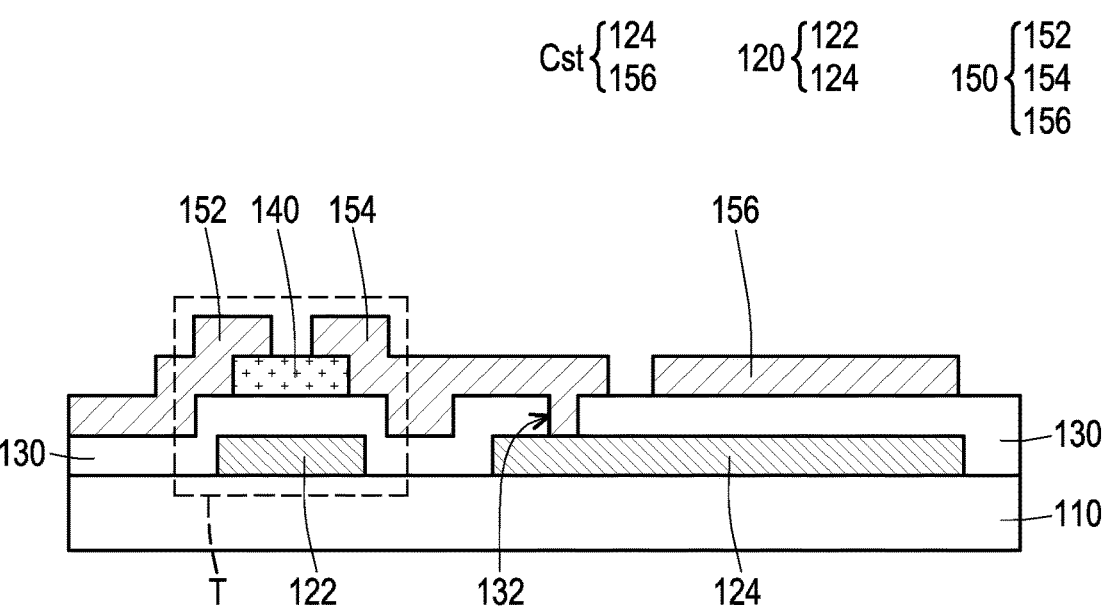

With reference to FIG. 1D, a second conductive layer 150 is formed on the semiconductor pattern 140 and the gate insulation layer 130. The second conductive layer 150 includes a first terminal 152 of the active device T, a second terminal 154 of the active device T, and a second electrode 156 of the storage capacitor Cst. The first terminal 152 of the active device T, the second terminal 154 of the active device T, and the second electrode 156 of the storage capacitor Cst are structurally separated from one another. Each of the first terminal 152 and the second terminal 154 of the active device T is electrically connected to the semiconductor pattern 140. The first terminal 152 of the active device T is further electrically connected to a data line (not shown). The second terminal 154 of the active device T is electrically connected to the first electrode 124 of the storage capacitor Cst through the contact window 132 of the gate insulation layer 130. The second electrode 156 of the storage capacitor Cst is electrically connected to a common line (not shown). In consideration of electrical conductivity, the second conductive layer 150 is normally made of a metal material, which should however not be construed as a limitation in the disclosure. According to other embodiments, the second conductive layer 150 may also be made of other conductive materials, such alloys, nitrides of metal materials, oxides of metal materials, oxynitrides of metal materials, or stacked layers of metal materials and other conductive materials.

Figure 1E:
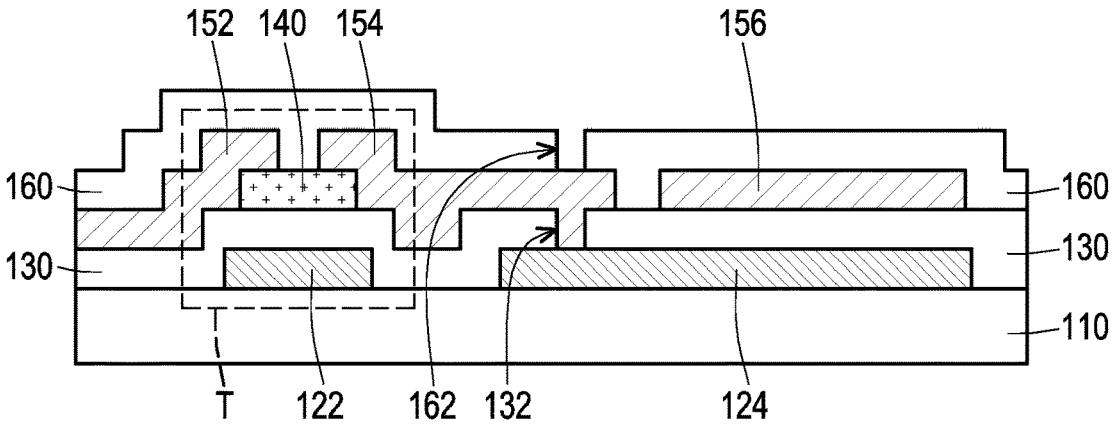

With reference to FIG. 1E, a passivation layer 160 is formed on the second conductive layer 150, where the passivation layer 160 has a contact window 162 exposing the second terminal 154 of the active device T. In an embodiment, a material of the passivation layer 160 may include an inorganic material (e.g., silicon oxide, silicon nitride, silicon oxynitride, or a stacked layer of at least two of the above materials), an organic material, or a combination of the above materials.

Figure 1F:
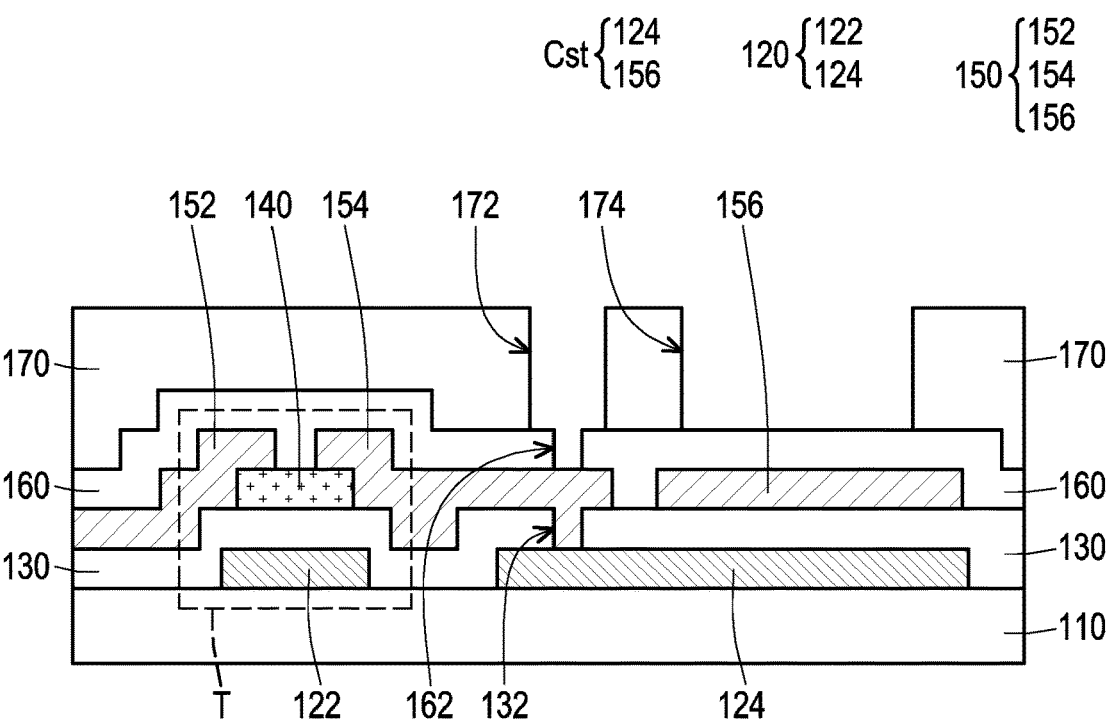

With reference to FIG. 1F, an insulation layer 170 is formed on the passivation layer 160. The insulation layer 170 may have a single-layer structure or a multi-layer structure. The insulation layer 170 has a contact window 172 that is overlapped with the contact window 162 of the passivation layer 160. In an embodiment, the insulation layer 170 may optionally have an opening 174 that is overlapped with the second electrode 156 of the storage capacitor Cst. In an embodiment, a material of the insulation layer 170 may include an inorganic material (e.g., silicon oxide, silicon nitride, silicon oxynitride, or a stacked layer of at least two of the above materials), an organic material, or a combination of the above.

Figure 1G:
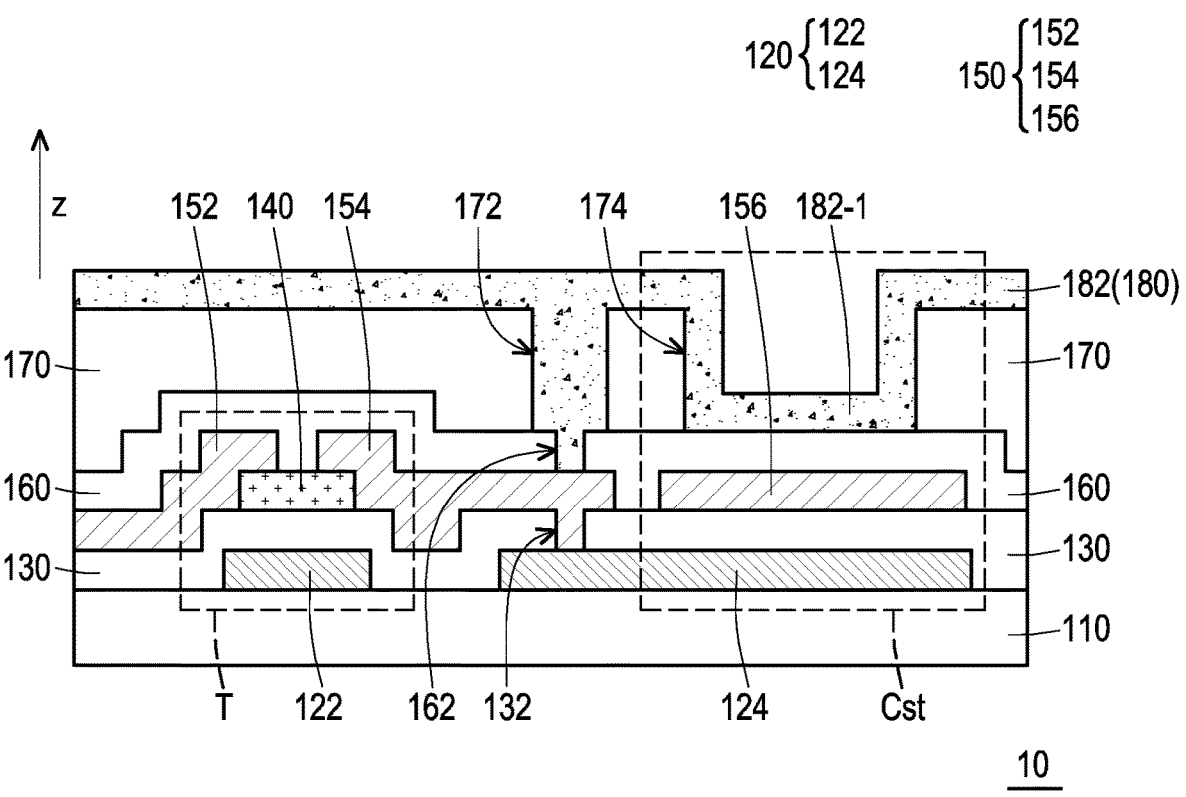

With reference to FIG. 1G, a third conductive layer 180 is formed on the passivation layer 160 to complete the manufacture of the active device substrate 10. The third conductive layer 180 is a light shielding conductive layer. The third conductive layer 180 includes an electrode 182. In an embodiment, the electrode 182 may be electrically connected to the second terminal 154 of the active device T through the contact window 172 of the insulation layer 170 and the contact window 162 of the passivation layer 160. In an embodiment, a portion 182-1 of the electrode 182 may fill the opening 174 of the insulation layer 170, the portion 182-1 of the electrode 182, a portion of the passivation layer 160, the second electrode 156, a portion of the gate insulation layer 130, and the first electrode 124 may form the storage capacitor Cst. Specifically, the portion 182-1 of the electrode 182 and the first electrode 124 are electrically connected to form a resultant double-layer electrode, an overlapping area of the resultant double-layer electrode and the second electrode 156 is large, and the storage capacitor Cst has a large capacitance value.

In an embodiment, an electronic ink layer (not shown) may be attached to the active device substrate 10 to form an electronic paper. The electronic ink layer may be a micro-capsule type, a microcup type, or any other type of the electronic ink layer. However, this should not be construed as a limitation in the disclosure, and in other embodiments, the active device substrate 10 may also be supplied to form other types of electronic products.

FIG. 2A to FIG. 2F are schematic cross-sectional views of a manufacturing process of an electrode of an active device substrate according to an embodiment of the disclosure. A method of manufacturing the electrode 182 is elaborated below with reference to FIG. 2A to FIG. 2F.

Figure 2A:
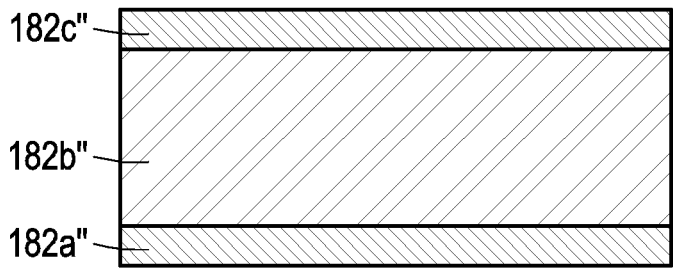
FIG. 2A to FIG. 2F are schematic cross-sectional views of a manufacturing process of an electrode of an active device substrate according to an embodiment of the disclosure.
Figure 2B:
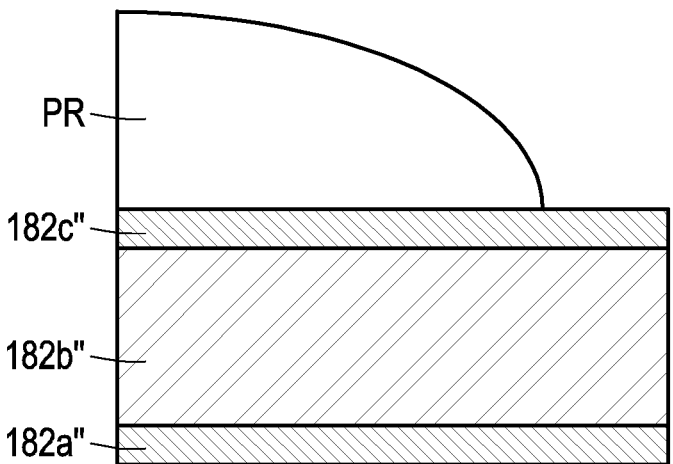

With reference to FIG. 2A, a first light shielding conductive material layer 182a'', a second light shielding conductive material layer 182b'', and a third light shielding conductive material layer 182c'' are sequentially formed. With reference to FIG. 2B, a photoresist pattern PR is formed on the third light shielding conductive material layer 182c''.

Figure 2C:
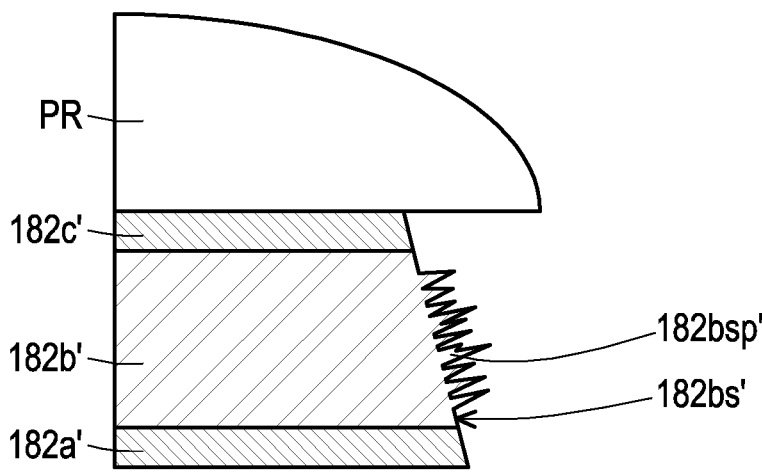

With reference to FIG. 2B and FIG. 2C, the first light shielding conductive material layer 182a'', the second light shielding conductive material layer 182b'', and the third light shielding conductive material layer 182c'' are patterned by using the photoresist pattern PR as a mask to form a first pre-light shielding conductive pattern layer 182a', a second pre-light shielding conductive pattern 182b', and a third pre-light shielding conductive pattern 182c', where a sidewall 182bs' of the second pre-light shielding conductive pattern 182b' has an uneven protruding microstructure 182bsp'.

Figure 2D:
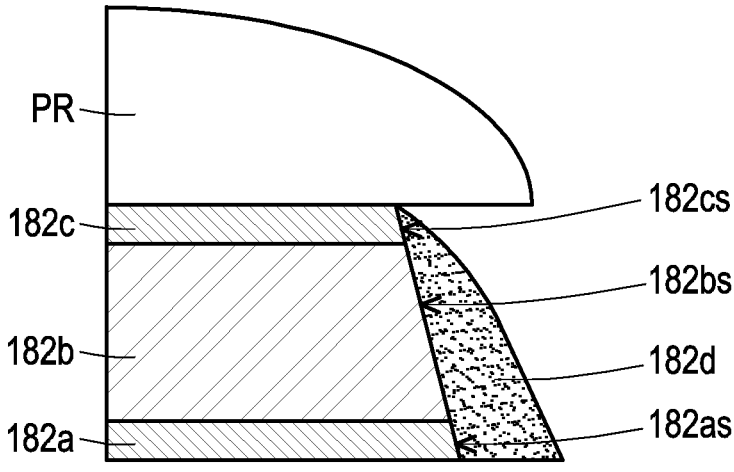

With reference to FIG. 2C and FIG. 2D, on the condition that the photoresist pattern PR covers the first pre-light shielding conductive pattern layer 182a', the second pre-light shielding conductive pattern 182b', and the third pre-light shielding conductive pattern 182c', oxygen is introduced to perform a plasma oxidation treatment process to form a first light shielding conductive pattern 182a, a second light shielding conductive pattern 182b, a third light shielding conductive pattern 182c, and a first metal oxide protection pattern 182d. Here, the first metal oxide protection pattern 182d is formed by performing a plasma oxidation treatment process on the sidewall 182bs' of the second pre-light shielding conductive pattern 182b'. The first metal oxide protection pattern 182d not only covers the sidewall 182bs of the second light shielding conductive pattern 182b but also extends to at least one portion of a sidewall 182as of the first light shielding conductive pattern 182a and at least one portion of a sidewall 182cs of the third light shielding conductive pattern 182c. The first metal oxide protection pattern 182d may mitigate the issue that the sidewall 182bs' of the second pre-light shielding conductive pattern 182b' has an uneven protruding microstructure 182bsp', thereby improving product reliability and enhancing product quality.

In an embodiment, the first metal oxide protection pattern 182d may completely cover the sidewall 182bs of the second light shielding conductive pattern 182b and cover at least one portion of the sidewall 182as of the first light shielding conductive pattern 182a and at least one portion of the sidewall 182cs of the third light shielding conductive pattern 182c.

Figure 2E:
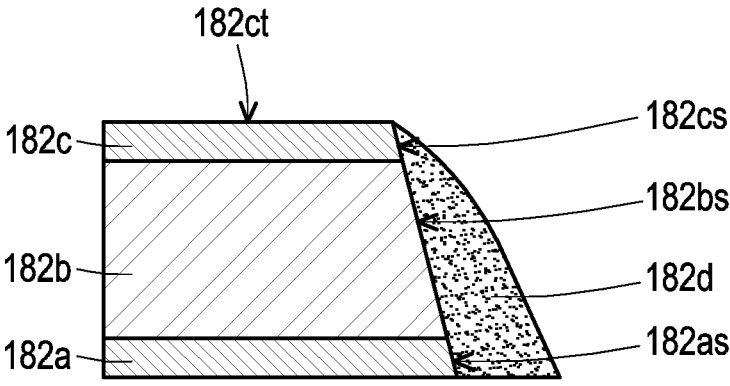
Figure 2F:
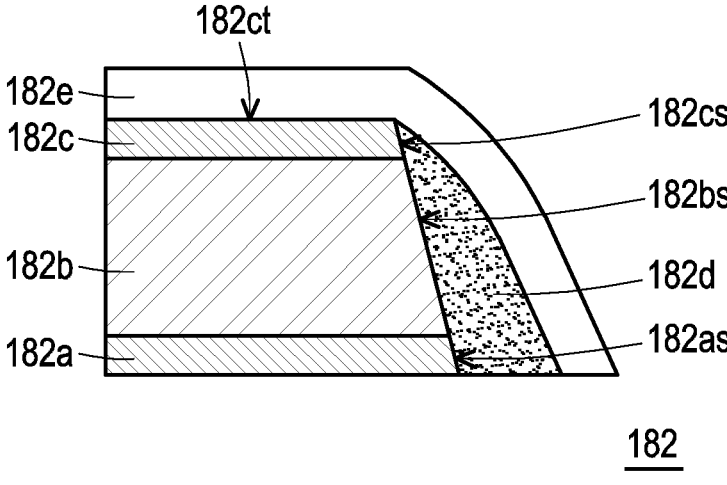

With reference to FIG. 2D and FIG. 2E, the photoresist pattern PR is removed to expose a top surface 182ct of the third light shielding conductive pattern 182c. With reference to FIG. 2F, a second metal oxide protection pattern 182e is formed on the top surface 182ct of the third light shielding conductive pattern 182c and the first metal oxide protection pattern 182d, thereby completing the manufacture of the electrode 182 provided in this embodiment.

Figure 3:
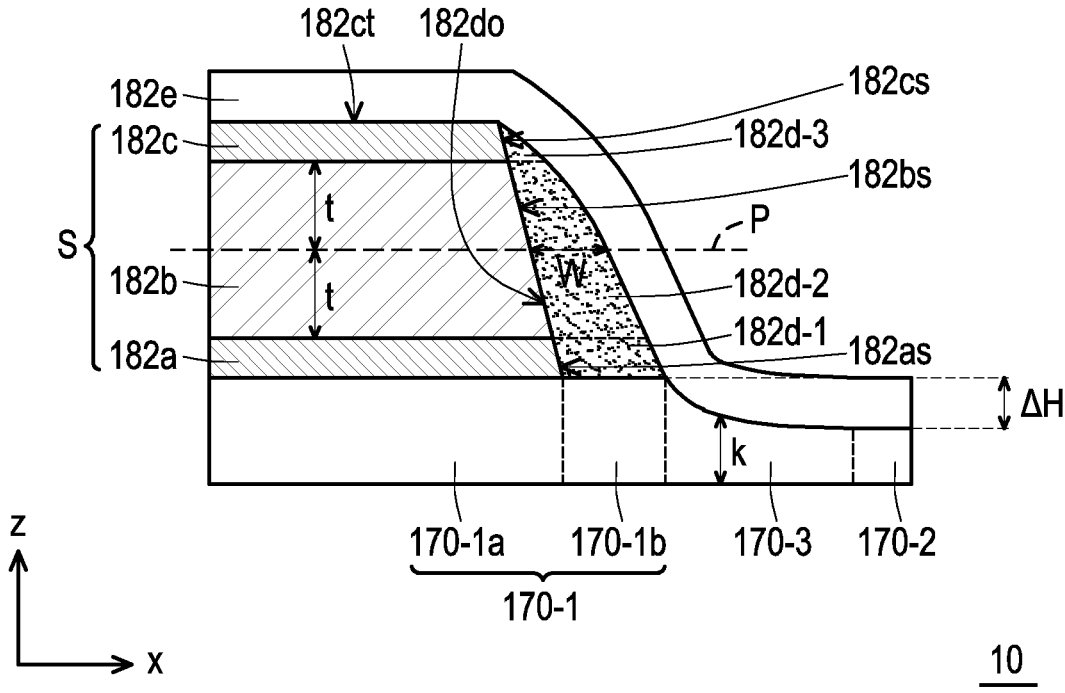
FIG. 3 is a schematic cross-sectional enlarged view of an electrode and an insulation layer of an active device substrate according to an embodiment of the disclosure.

FIG. 3 is a schematic cross-sectional enlarged view of an electrode and an insulation layer of an active device substrate according to an embodiment of the disclosure.

With reference to FIG. 1G and FIG. 3, the active device substrate 10 includes the substrate 110, the active device T disposed on the substrate 110, and the electrode 182 electrically connected to the active device T. The electrode 182 includes the first light shielding conductive pattern 182a, the second light shielding conductive pattern 182b, and the third light shielding conductive pattern 182c, where the first light shielding conductive pattern 182a, the second light shielding conductive pattern 182b, and the third light shielding conductive pattern 182c are sequentially stacked in a direction z away from the substrate 110 to form a conductive stack S. The electrode 182 further includes the first metal oxide protection pattern 182d, the first metal oxide protection pattern 182d has an opening 182do, and the conductive stack S is disposed in the opening 182do.

The first metal oxide protection pattern 182d covers the sidewalls 182as, 182bs, and 182cs of the first light shielding conductive pattern 182a, the second light shielding conductive pattern 182b, and the third light shielding conductive pattern 182c of the conductive stack S but does not cover the top surface 182ct of the third light shielding conductive pattern 182c of the conductive stack S. According to an embodiment, in a top view (not shown) of the active device substrate 10, the first metal oxide protection pattern 182d may have a ring-shaped structure surrounding the sidewall 182as of the first light shielding conductive pattern 182a, the sidewall 182bs of the second light shielding conductive pattern 182b, and the sidewall 182cs of the third light shielding conductive pattern 182c.

The first metal oxide protection pattern 182d includes a first portion 182d-1, a second portion 182d-2, and a third portion 182d-3. The first portion 182d-1, the second portion 182d-2, and the third portion 182d-3 of the first metal oxide protection pattern 182d respectively contact the sidewalls 182as, 182bs, and 182cs of the first light shielding conductive pattern 182a, the second light shielding conductive pattern 182b, and the third light shielding conductive pattern 182c, and materials of the first portion 182d-1, the second portion 182d-2, and the third portion 182d-3 of the first metal oxide protection pattern 182d are the same. The first metal oxide protection pattern 182d may protect the second light shielding conductive pattern 182b from corrosion.

In an embodiment, at least one of the first light shielding conductive pattern 182a and the third light shielding conductive pattern 182c includes a first metal, the second light shielding conductive pattern 182b includes a second metal different from the first metal, and the materials of the first portion 182d-1, the second portion 182d-2, and the third portion 182d-3 of the first metal oxide protection pattern 182d is an oxide of the second metal. For instance, in this embodiment, the material of the first light shielding conductive pattern 182a may be molybdenum nitride (MoN), the material of the second light shielding conductive pattern 182b may be aluminum (Al), the material of the third light shielding conductive pattern 182c may be molybdenum (Mo), the first metal included in at least one of the first light shielding conductive pattern 182a and the third light shielding conductive pattern 182c may be Mo, the second light shielding conductive pattern 182b includes Al different from Mo, and the materials of the first portion 182d-1, the second portion 182d-2, and the third portion 182d-3 of the first metal oxide protection pattern 182d may be aluminum oxide (AlO2), which should however not be construed as a limitation in the disclosure.

In an embodiment of the disclosure, the first metal oxide protection pattern 182d has a width W in a direction x substantially parallel to the substrate 110, and the width W gradually decreases as the first metal oxide protection pattern 182d moves away from the substrate 110. For instance, in this embodiment, a hypothetical reference plane P divides the second light shielding conductive pattern 182b into an upper portion and a lower portion, and a thickness t of the two portions of the second light shielding conductive pattern 182b respectively located on upper and lower sides of the hypothetical reference plane P are equal, and the width W of the first metal oxide protection pattern 182d on the hypothetical reference plane P may fall within a range of 350 Å~650 Å, which should however not be construed as a limitation in the disclosure.

In an embodiment of the disclosure, the active device substrate 10 further includes an insulation layer 170 that is disposed between the electrode 182 and the active device T and has a contact window 172. The electrode 182 is disposed on the insulation layer 170, and one portion of the electrode 182 fills the contact window 172 of the insulation layer 170, so as to be electrically connected to the active device T. Specifically, the insulation layer 170 includes a thick portion 170-1 overlapped with the conductive stack S and the first metal oxide protection pattern 182d and a thin portion 170-2 located outside an area occupied by the conductive stack S and the first metal oxide protection pattern 182d. In this embodiment, the thick portion 170-1 of the insulation layer 170 may include a first sub-portion 170-1a overlapped with the conductive stack S and a second sub-portion 170-1b overlapped with the first metal oxide protection pattern 182d. The thick portion 170-1 may also be referred to as a protruding platform of the insulation layer 170, and the conductive stack S and the first metal oxide protection pattern 182d are disposed on the protruding platform. For instance, in this embodiment, the thick portion 170-1 and the thin portion 170-2 of the insulation layer 170 have a height difference ΔH in the direction z perpendicular to the substrate 110, and the height difference ΔH may fall within a range of 200 Å~400 Å, which should however not be construed as a limitation in the disclosure.

In an embodiment of the disclosure, the insulation layer 170 further includes a connection portion 170-3 that connects the thick portion 170-1 and the thin portion 170-2 and is located outside the area occupied by the conductive stack S and the first metal oxide protection pattern 182d. The connection portion 170-3 has a thickness k in the direction z substantially perpendicular to the substrate 110, and the thickness k of the connection portion 170-3 gradually decreases from the thick portion 170-1 to the thin portion 170-2. In an embodiment of the disclosure, the electrode 182 further includes a second metal oxide protection pattern 182e that covers the third light shielding conductive pattern 182c of the conductive stack S, the first metal oxide protection pattern 182d, the connection portion 170-3 of the insulation layer 170, and the thin portion 170-2 of the insulation layer 170. In an embodiment of the disclosure, the first metal oxide protection pattern 182d, the connection portion 170-3 of the insulation layer 170, and the thin portion 170-2 of the insulation layer 170 may be connected to form a gentle slope, which is conducive to the coverage on the conductive stack S, the first metal oxide protection pattern 182d, and the insulation layer 170 by the second metal oxide protection pattern 182e, thereby improving the yield of the active device substrate 10. In an embodiment of the disclosure, the material of the second metal oxide protection pattern 182e is, for instance, indium tin oxide (ITO), which should however not be construed as a limitation in the disclosure.

It should be noted that reference numbers of the devices and a part of contents of the previous embodiments are also used in the following embodiments, where the same reference numbers denote the same or like devices, and descriptions of the same technical contents are omitted. The previous embodiments may be referred for descriptions of the omitted parts, and detailed descriptions thereof are not repeated in the following embodiments.

Figure 4:
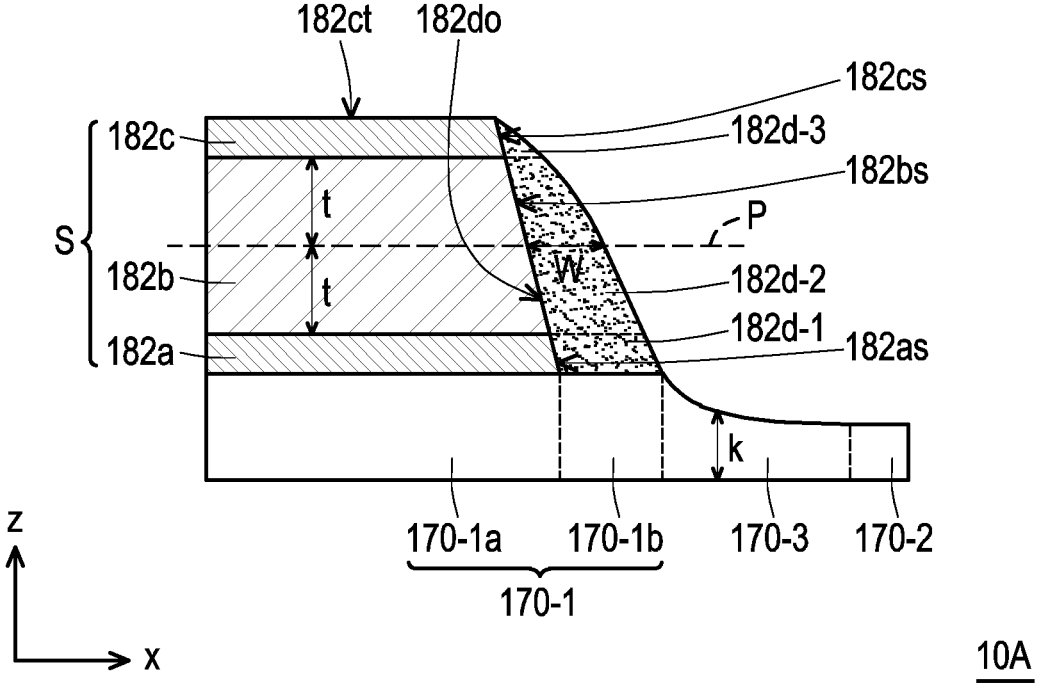
FIG. 4 is a schematic cross-sectional enlarged view of an electrode and an insulation layer of an active device substrate according to another embodiment of the disclosure.

FIG. 4 is a schematic cross-sectional enlarged view of an electrode and an insulation layer of an active device substrate according to another embodiment of the disclosure. An active device substrate 10A in FIG. 4 is similar to the active device substrate 10 in FIG. 3, while the difference between the two lies in that an electrode 182A of the active device substrate 10A in FIG. 4 is different from the electrode 182 of the active device substrate 10 in FIG. 3. To be specific, compared to the electrode 182 in FIG. 3, the electrode 182A in FIG. 4 may not be equipped with the second metal oxide protection pattern 182e.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An active device substrate, comprising:
   a substrate;
   an active device, disposed on the substrate; and
   an electrode, electrically connected to the active device and comprising:
   a first light shielding conductive pattern;
   a second light shielding conductive pattern;
   a third light shielding conductive pattern, wherein the first light shielding conductive pattern, the second light shielding conductive pattern, and the third light shielding conductive pattern are sequentially stacked to form a conductive stack; and
   a first metal oxide protection pattern, having an opening, wherein the conductive stack is disposed in the opening, the first metal oxide protection pattern comprises a first portion, a second portion, and a third portion, the first portion, the second portion, and the third portion of the first metal oxide protection pattern respectively contact a sidewall of the first light shielding conductive pattern, a sidewall of the second light shielding conductive pattern, and a sidewall of the third light shielding conductive pattern, and a material of the first portion, a material of the second portion, and a material of the third portion of the first metal oxide protection pattern are identical;
   wherein the first metal oxide protection pattern has a width in a direction substantially parallel to the substrate, and the width gradually decreases as the first metal oxide protection pattern moves away from the substrate.

2. The active device substrate according to claim 1, wherein at least one of the first light shielding conductive pattern and the third light shielding conductive pattern comprises a first metal, the second light shielding conductive pattern comprises a second metal different from the first metal, and the material of the first portion, the material of the second portion, and the material of the third portion of the first metal oxide protection pattern are an oxide of the second metal.

3. An active device substrate, comprising:
   a substrate;
   an active device, disposed on the substrate; and
   an electrode, electrically connected to the active device and comprising:
   a first light shielding conductive pattern;
   a second light shielding conductive pattern;
   a third light shielding conductive pattern, wherein the first light shielding conductive pattern, the second light shielding conductive pattern, and the third light shielding conductive pattern are sequentially stacked to form a conductive stack; and
   a first metal oxide protection pattern, having an opening, wherein the conductive stack is disposed in the opening, the first metal oxide protection pattern comprises a first portion, a second portion, and a third portion, the first portion, the second portion, and the third portion of the first metal oxide protection pattern respectively contact a sidewall of the first light shielding conductive pattern, a sidewall of the second light shielding conductive pattern, and a sidewall of the third light shielding conductive pattern, and a material of the first portion, a material of the second portion, and a material of the third portion of the first metal oxide protection pattern are identical; and an insulation layer, disposed between the electrode and the active device and having a contact window, wherein the electrode is disposed on the insulation layer, and one portion of the electrode fills the contact window of the insulation layer, so as to be electrically connected to the active device, the insulation layer comprising:

a thick portion, overlapped with the conductive stack and the first metal oxide protection pattern; and a thin portion, located outside an area occupied by the conductive stack and the first metal oxide protection pattern.

4. The active device substrate according to claim 3, wherein the insulation layer further comprises:

a connection portion, connecting the thick portion and the thin portion and located outside the area occupied by the conductive stack and the first metal oxide protection pattern, wherein the connection portion has a thickness in a direction substantially perpendicular to the substrate, and the thickness of the connection portion gradually decreases from the thick portion to the thin portion.

5. The active device substrate according to claim 4, wherein the electrode further comprises:

a second metal oxide protection pattern, covering the third light shielding conductive pattern of the conductive stack, the first metal oxide protection pattern, the connection portion of the insulation layer, and the thin portion of the insulation layer.

6. The active device substrate according to claim 3, wherein the thick portion of the insulation layer comprises:

a first sub-portion, overlapped with the conductive stack; and a second sub-portion, overlapped with the first metal oxide protection pattern.

\* \* \* \* \*